(12) United States Patent
Bitter

(10) Patent No.: US 8,230,771 B2
(45) Date of Patent: Jul. 31, 2012

(54) HYDRAULIC ARRANGEMENT

(75) Inventor: Marcus Bitter, Mannheim (DE)

(73) Assignee: Deere & Company, Moline, IL (US)

( * ) Notice: Subject to any disclaimer, the term of this patent is extended or adjusted under 35 U.S.C. 154(b) by 673 days.

(21) Appl. No.: 12/373,603

(22) PCT Filed: Jul. 2, 2007

(86) PCT No.: PCT/EP2007/056645
§ 371 (c)(1),
(2), (4) Date: Jan. 13, 2009

(87) PCT Pub. No.: WO2008/006730
PCT Pub. Date: Jan. 17, 2008

(65) Prior Publication Data
US 2009/0255248 A1    Oct. 15, 2009

(30) Foreign Application Priority Data
Jul. 14, 2006  (DE) .......................... 10 2006 032 599

(51) Int. Cl.
*F15B 13/04* (2006.01)
*F16D 31/02* (2006.01)
(52) U.S. Cl. ............................... 91/404; 91/361; 60/477
(58) Field of Classification Search .................. 60/406, 60/477, 481; 91/361, 398, 404, 405
See application file for complete search history.

(56) References Cited

U.S. PATENT DOCUMENTS

| | | | | |
|---|---|---|---|---|
| 3,842,943 A | * | 10/1974 | Nakamura et al. | 60/477 |
| 4,202,175 A | * | 5/1980 | Hale et al. | 60/477 |
| 5,072,648 A | * | 12/1991 | Krahn et al. | 91/405 |
| 5,653,155 A | * | 8/1997 | Hausman et al. | 91/508 |
| 5,839,345 A | * | 11/1998 | Sandau et al. | 91/457 |
| 6,385,969 B1 | * | 5/2002 | Huber | 60/481 |
| 6,901,729 B1 | | 6/2005 | Otto et al. | |

FOREIGN PATENT DOCUMENTS

| | | |
|---|---|---|
| DE | 119726821 | 1/1998 |
| DE | 9958341 | 7/2001 |
| DE | 10330344 | 2/2005 |
| DE | 102004056418 | 5/2006 |

* cited by examiner

*Primary Examiner* — Michael Leslie

(57) ABSTRACT

A hydraulic arrangement for regulating a lifting mechanism (12) of an agricultural machine (10) is described. The hydraulic arrangement (16) comprises a hydraulic cylinder (24) having a chamber (50) capable of being acted upon by pressure, a proportionally adjustable inflow valve (22) which is connected on the outlet side via an inflow line (30) to the chamber (50) and which is connected on the inlet side to a hydraulic pump (18, 18'), a first outlet line (32) which makes a connection between the chamber (50) and a hydraulic tank (20), adjustment means (42, 44) for generating an adjustment signal for the hydraulic cylinder (24), and an electronic control unit (40).

9 Claims, 3 Drawing Sheets

HYDRAULIC ARRANGEMENT

RELATED APPLICATION

Figure 1:
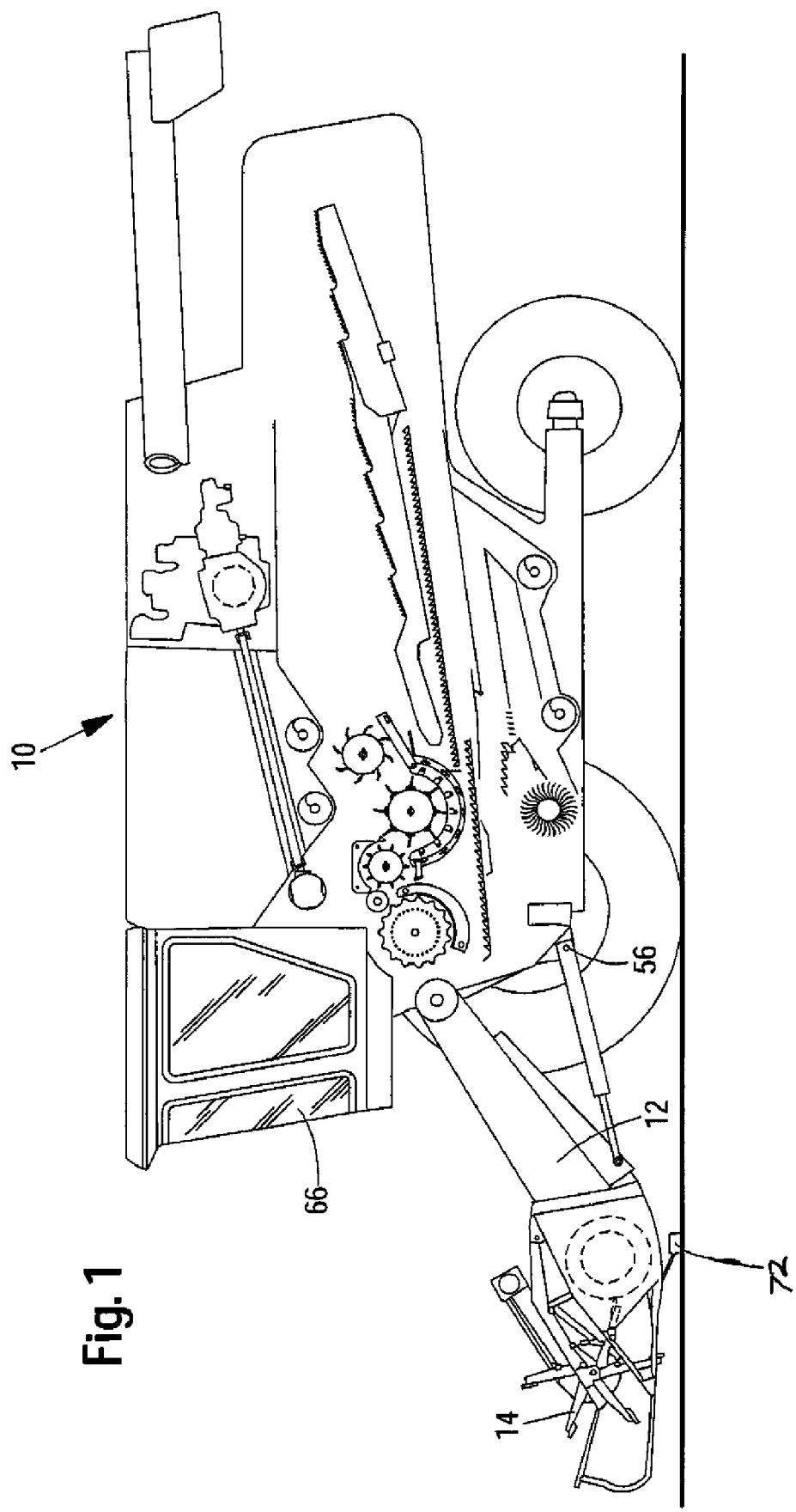

This application claims benefit of the filing date of international application number PCT/EP2007/056645.

Hydraulic arrangement for regulating a lifting mechanism of an agricultural machine, with at least one first hydraulic cylinder having a chamber capable of being acted upon by pressure, with a proportionally adjustable inflow valve which is connected on the outlet side via a first inflow line to the chamber and which is connected on the inlet side to a hydraulic pump, with at least one first outflow line which makes a connection between the chamber and a hydraulic tank, with adjustment means for generating an adjustable signal for the hydraulic cylinder, and with an electronic control unit.

Agricultural machines, for example harvesters or tractors, have attachments or mounted implements which are arranged in the front or rear region of the machines via what are known as lifting mechanisms. The lifting mechanisms make it possible for the attachments or mounted implements to be raised and lowered into a transport position and into a working position respectively. Lifting mechanisms are known which, in addition to a raising and lowering function controlled by hydraulic cylinders, also have, furthermore, a function for setting a ground contact pressure for the attachment or mounted implement or allow a compensation of the position of the attachment or mounted implement.

One example of a lifting mechanism of this type is disclosed in U.S. Pat. No. 6,901,729 B1. This proposes a hydraulic arrangement for a lifting mechanism of a harvesting attachment of a harvester, the said arrangement allowing both a raising and lowering function and a function for setting the ground contact pressure and position compensation in the event of an oblique position of the harvesting attachment, two hydraulic cylinders being used which are in dependence on one another and which are switched such that automatic position compensation takes place via a pressure compensation of the chambers located on the lifting-mechanism side. Furthermore, the contact pressure for the harvesting attachment can be varied via a connectable hydraulic accumulator. The hydraulic arrangement disclosed there has, in addition to the use of a space-consuming hydraulic accumulator, a large number of hydraulic components which necessitate a considerable outlay in structural terms and are cost-intensive.

The object on which the invention is based is seen in specifying a hydraulic arrangement of the type mentioned in the introduction, by means of the abovementioned problems are overcome.

The object is achieved, according to the invention, by means of the teaching of Patent Claim 1. Further advantageous refinements and developments of the invention may be gathered from the subclaims.

According to the invention, a hydraulic arrangement of the type mentioned in the introduction is designed in such a way that a first electroproportional pressure relief valve is arranged in the first outflow line and a first non-return valve closing in the direction of the inflow valve is arranged in the first inflow line, and also one or more sensors related to the at least first hydraulic cylinder and generating a sensor signal are provided, the at least first pressure relief valve being controllable or regulatable as a function of the one or more sensor signals and/or of the adjustment signal. By the electrically proportionally activatable pressure relief valve being arranged in the outflow line of the hydraulic cylinder, the chamber of the hydraulic cylinder can be emptied in a directed manner, so that, in conjunction with the proportionally adjustable or activatable inflow valve, both a raising and lowering function and a metered action of pressure upon the chamber can take place, in order, for example, to set a ground contact pressure for a mounted implement affixed to a lifting mechanism of an agricultural machine. The emptying of the chamber takes place solely via the pressure relief valve in the outflow line, since an emptying of the chamber via the inflow valve is prevented by the non-return valve being arranged in the inflow line. A directed activation or regulation of the pressure relief valve takes place via the electronic control unit, by means of which the control signals for the pressure relief valve and for the inflow valve are generated as a function of one or more sensor signals and/or as a function of the adjustment signal by means of which, for example, a filling or emptying of the chamber or a raising or a lowering function is initiated. Furthermore, the emptying of the chamber may also take place at a different speed by means of different opening cross sections of the pressure relief valve, since the outflowing quantity of hydraulic fluid is limited by the opening cross section of the pressure relief valve. The hydraulic arrangement according to the invention is designed in such a way that various functions are made possible by a raising and lowering function in combination with the controllable pressure limitation. Thus, an attachment or mounted implement of an agricultural machine fastened to a lifting mechanism operated by means of the hydraulic arrangement according to the invention can be raised and lowered or brought from a transport position into an operating position, whilst in the operating position, for example, a ground contact pressure can be predetermined. Furthermore, the hydraulic arrangement according to the invention makes it possible to have further functions, such as, for example, position regulation or position compensation, vibration damping, a floating position and traction regulation, the individual functions mentioned being described with reference to the exemplary embodiments described later. The hydraulic arrangement may also have, in addition to the first hydraulic cylinder, a second hydraulic cylinder which is operated essentially in the same way as, that is to say similarly to, the first hydraulic cylinder via a second inflow valve which is correspondingly arranged parallel to the first inflow valve via a second inflow line. Even further hydraulic cylinders may be arranged and operated in the same way. Thus, parallel to the first hydraulic cylinder, at least one second hydraulic cylinder may be provided which has a chamber capable of being acted upon by pressure and which is provided similarly to the first hydraulic cylinder with a second inflow line provided with a second non-return valve and a second outflow line provided with a second electroproportional pressure relief valve, the second pressure relief valve being controllable or regulatable as a function of the one or more sensor signals and/or of the adjustment signal. In the same way, even further hydraulic cylinders with correspondingly further inflow valves and inflow and outflow lines or pressure relief and non-return valves may be provided. Consequently, two or more hydraulic cylinders can be operated independently of one another, but vary their piston positions synchronously with one another as a function of the control signals.

In a further embodiment, the second or further hydraulic cylinder may also be activated as a function of sensors assigned to it. For this purpose, one or more sensors related to the second or the further hydraulic cylinders and generating a sensor signal may be provided. The second or the further pressure relief valves can then be controllable or regulatable as a function of the one or more sensor signals generated by the sensors related to the second or further hydraulic cylinder. The hydraulic cylinders can thus be activatable independently of one another and consequently be regulatable individually, so that, for example, sensor-controlled position regulation can take place according to the arrangement and orientation of the individual hydraulic cylinders on the lifting mechanism, in that the various hydraulic cylinders have different piston positions.

The adjustment means are preferably designed as an actuating lever, in particular joystick, or actuating switch. An operator can then, by actuating the actuating lever or joystick or by switching an actuating switch, perform various functions, such as, for example, the raising or lowering of a mounted implement at the corner of a field or on transport journeys. When the adjustment means is actuated, corresponding signals are sent to the control unit which utilizes these control signals corresponding to generation for the inflow valve and the pressure relief valve. In this case, to generate the control signals, both the adjustment signal alone and further signals delivered by the sensors may be employed, so that in addition, for example during lowering, the lowering speed is monitored by means of a corresponding sensor signal and the opening pressure or the opening cross section of the pressure relief valve is limited correspondingly.

The sensors may be designed, for example, as position sensors which deliver a sensor signal proportional to a position of a hydraulic cylinder piston. Consequently, piston movements can be detected, and the signals delivered used, for example, for regulating or controlling movement speeds (lowering speeds) or even for damping vibrational movements.

The sensors may also be designed, for example, as pressure sensors which deliver a sensor signal proportional to a pressure in the chamber of a hydraulic cylinder. Consequently, pressure states can be detected, and the signals delivered used, for example, for regulating or controlling the chamber pressure of a hydraulic cylinder, in which case, depending on the arrangement of the hydraulic cylinder, these sensor signals make it possible, for example, to regulate or control the contact pressure for an attachment or mounted implement or else the traction for a drawn working implement. Alternatively, instead of pressure sensors, load bolts or other sensors may also be used, which make it possible to deduce the pressure prevailing in the chamber of the hydraulic cylinder.

Furthermore, a hydraulic arrangement according to the invention may also comprise one or more setting devices, preferably a potentiometer which is connected to the control unit and by means of which a manipulated variable for the control unit can be predetermined. A guide value or desired value for a signal delivered by a sensor can thereby be predetermined, so that, for example, the pressure acting in the chamber or else the speed of movement of the hydraulic cylinder piston can be limited or can be set. An operator can then, for example by actuating the setting device, predetermine the maximum contact pressure, whereupon a corresponding control signal or a corresponding control procedure is generated by the control unit. The same applies accordingly to a setting device for predetermining another manipulated variable, such as, for example, the lowering speed, in which case a position change per unit time of the piston of a hydraulic cylinder can be set or can be limited.

According to the invention, the hydraulic pump of the hydraulic arrangement may be designed as a constant-flow pump, the inflow valve also having on the outlet side, in addition to the connection to the hydraulic cylinder (inflow line), a connection to the hydraulic tank. This ensures that, when hydraulic fluid is no longer to flow into the chamber, a hydraulic fluid flow will nevertheless continues, which is then conducted into the tank, so that the pump can continue to convey, unchanged. The pressure in the chamber is then not controlled via the quantity of hydraulic fluid conveyed by the pump, but, instead, via the quantity admitted by the inflow valve and conveyed at a constant rate by the pump.

According to an alternative embodiment, the hydraulic pump is designed as a variable-displacement pump system which is adjustable as a function of a pressure acting in the first and/or second or further inflow line, a load-sensing device (device for load detection or pressure detection in the inflow line) being provided, via which the variable-displacement pump system can be adjusted or can be regulated. The inflow valve in this case has on the inlet side a connection to the hydraulic tank, whilst the pressure building up in the inflow line can be broken down via the tank when the inflow valve is closed on the inlet side to the variable-displacement pump system, so that the non-return valve located in an inflow line closes and the load-sensing device is correspondingly relieved. The conveyance quantity of the variable-displacement pump system is in this case varied, by control according to demand, via the load-sensing device connected to the inflow line or inflow lines, so that, when the inflow valve is open on the inlet side to the variable-displacement pump system, the pressure in the chamber of a hydraulic cylinder is determined directly by means of the quantity of hydraulic fluid conveyed by the variable-displacement pump system.

Furthermore, the hydraulic arrangement according to the invention may be connected to further sensors, for example contact sensors, by means of which a position of an attachment or mounted implement fastened to a lifting mechanism of an agricultural machine is detected with respect to the ground surface, so that, by the hydraulic components of the hydraulic arrangement being activated correspondingly, a position regulation of the attachment or working implement with respect to the ground surface can take place. Thus, for example, slope compensation can be carried out, so that the attachment or working implement is always guided parallel to the ground surface, and ground unevennesses which may have an adverse effect on the working result are compensated. Contact sensors of this type may be arranged, for example, on both sides of the lifting mechanism or of the attachment or working implement and indicate a difference signal as soon as one side of the lifting mechanism or of the attachment or working implement varies its distance from the ground.

Figure 2:
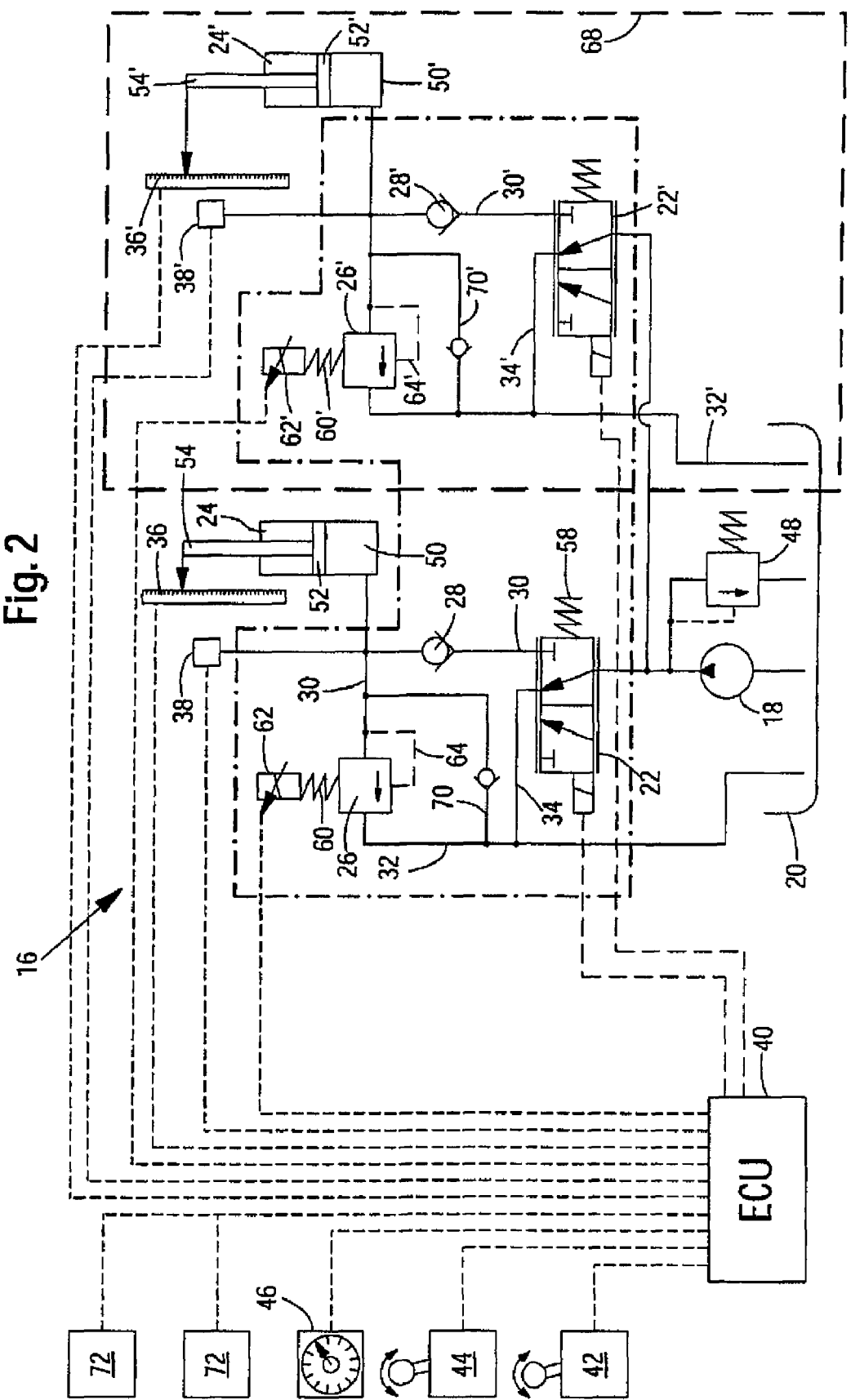
Figure 3:
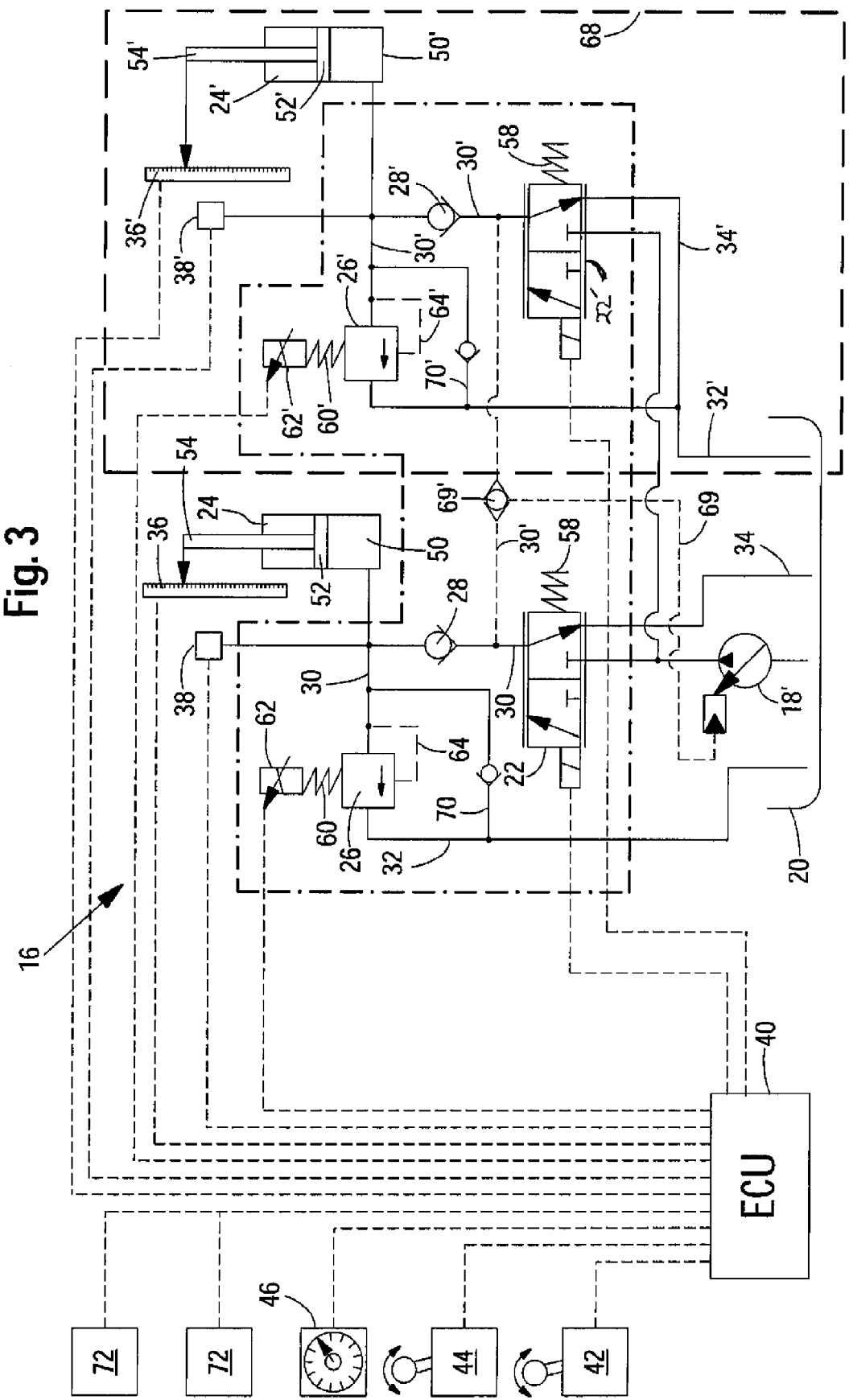

The invention and also further advantages and advantageous developments and refinements of the invention are described and explained in more detail below with reference to the drawings which show an exemplary embodiment of the invention and in which:

FIG. 1 shows an agricultural machine in the form of a combine harvester with a hydraulic arrangement according to the invention for a lifting mechanism, and FIG. 2 shows a circuit diagram of a hydraulic arrangement according to the invention with a fixed-displacement pump system, and FIG. 3 shows a circuit diagram of a hydraulic arrangement according to the invention with a variable-displacement pump system.

FIG. 1 shows an agricultural machine 10 in the form of a combine harvester with a lifting mechanism 12 which has an attachment 14 designed as a reel. The lifting mechanism 12 is actuated via a hydraulic arrangement 16 according to the invention which is illustrated in detail in FIGS. 2 and 3. The agricultural machine 10 is illustrated as a combine harvester by way of example. Other agricultural machines may also be equipped with the hydraulic arrangement 16 according to the invention in order to vary the position of a working implement or attachment 14 or to raise or lower it. Thus, the invention may also be employed, for example, on tractors or on other agricultural machines, on which lifting mechanisms 12 for raising and lowering working implements or attachments 14 are used.

A hydraulic arrangement 16 according to the invention has a hydraulic pump 18, a hydraulic tank 20, a proportionally adjustable inflow valve 22, a hydraulic cylinder 24, an electroproportional pressure relief valve 26, a non-return valve 28 closing in the direction of the inflow valve 22, an inflow line 30, a first outflow line 32 and a second outflow line 34.

Furthermore, a position sensor 36 and a pressure sensor 38 are provided.

To activate the hydraulic arrangement 16, an electronic control unit 40 is provided, which is connected to adjustment means 42, to an actuation switch 44 having a plurality of switching positions and to a setting device 46 and which receives and evaluates electronic signals from the sensors 36, 38, the adjustment means 42, the actuating switch 44 and the setting device 46 and also generates and transmits control signals for the electronically activatable hydraulic components (inflow valve 22, pressure relief valve 26).

To limit the pressure of the hydraulic fluid conveyed by the hydraulic pump 18, a pressure limiting unit 48 is provided which conducts excess hydraulic fluid into the hydraulic tank 20.

The hydraulic cylinder 24 has a chamber 50 which is capable of being acted upon by pressure and which is closed off via a moveable piston 52, the piston 52 being connected pivotably to the lifting mechanism 12 via a piston rod 54, and the hydraulic cylinder 24 being connected pivotably on the piston-head side to a frame part 56 of the agricultural machine 10. A reverse arrangement may, of course, also be employed in this case.

The inflow valve 22 is designed as a proportionally adjustable ⅔-way valve, and it is connected on the inlet side to the hydraulic pump 18 and on the outlet side, on the one hand, to the inflow line 30 and, on the other hand, to the second outflow line 34. The second outflow line 34 issues into the hydraulic tank 20 via the first outflow line 32. It may, however, also be led directly into the tank 20. In a first exemplary embodiment, the hydraulic pump 18 is designed as a fixed-displacement conveying pump. The second outflow line 34 ensures that excess hydraulic fluid can flow out into the hydraulic tank 20 in a position closed on the outlet side of the inflow valve 22 to the inflow line 30.

The inflow line 30 connects the inflow valve 22, which can be activated electronically via the electronic control unit 40 and which is prestressed via a prestressing spring 58 into a basic position closed to the inflow line 30, to the chamber 50 of the hydraulic cylinder, the inflow line 30 issuing into the first outflow line 32. The inflow line 30 may, however, also issue as a separately routed line into the chamber. The non-return valve 28 is arranged in such a way that a backflow of the hydraulic fluid, supplied to the chamber 50 by the hydraulic pump 18, via the inflow line 30 is prevented, the non-return valve 28 being arranged between the issue of the inflow line 30 into the outflow line 32 and the inflow valve.

The first outflow line 32 connects the chamber 50 to the hydraulic tank 20, the pressure relief valve 26 being arranged in such a way that a controlled or controllable or regulatable outflow of hydraulic fluid from the chamber 50 via the first outflow line 32 into the hydraulic tank 20 can take place. The pressure relief valve 26 is designed as an electrically controllable or regulatable pressure relief valve 26 and is prestressed via a prestressing spring 60 into a closed basic position. Via an electromagnetic regulating coil 62, the pressure relief valve 26 can be activated or controlled or regulated so as to open by the electronic control unit 40, that is to say the opening pressure capable of being set on the pressure relief valve 26 may be predetermined, so that, depending on the hydraulic pressure prevailing in the chamber 50, an outflow of hydraulic fluid from the chamber 50 into the hydraulic tank 20 can take place. In the event of a failure of the electronics, the pressure relief valve 26 is automatically brought into the closed basic position by means of the prestressing spring 60. A control line 64 connected to the first outflow line 32 on the hydraulic-cylinder side ensures protection against excess pressure, so that the pressure relief valve 26 opens at a limit pressure capable of being set via the prestressing spring 62. An outflow of hydraulic fluid from the chamber 50 into the hydraulic tank 20 can therefore take place only via the pressure relief valve 26, since an outflow via the inflow line 30 is prevented by the non-return valve 28.

The pressure sensor 38 is arranged in such a way that a pressure acting in the chamber 50 can be detected and can be evaluated by the electronic control unit 40 or a signal proportional to the pressure in the chamber 50 can influence the generation of control signals. In the exemplary embodiment illustrated, the pressure sensor 38 is arranged between the pressure relief valve 26 and the hydraulic cylinder 24 in the first outflow line 30.

The position sensor 36 is connected to the piston 52 or the piston rod 54 and detects a change in the position of the piston 52 within the hydraulic cylinder 24. The signals from the position sensor 36 are likewise sent to the electronic control unit 40 and can be evaluated or taken into account there in order to generate control signals.

Via the adjustment means 42, which are designed, for example, as an actuating lever or joystick, an operator, for example from a cab 66 of the agricultural machine 10, can trigger an adjustment signal, a signal being generated, such as, for example, a raising or lowering signal, which the electronic control unit 40 correspondingly records and evaluates and generates a corresponding control signal for activating the hydraulic components (inflow valve 22, pressure relief valve 26). The same applies to the actuating switch 44, by means of which a specific mode can be set (for example, a field corner mode, a ground contact pressure mode, a floating position mode or a springing mode or another mode which signals a specific control procedure for the electronic control unit 40) which signals a specific (preset) control algorithm or corresponding control procedure stored or filed in the electronic control unit 40.

The setting device 46 is preferably designed as a settable rotary knob or rotary switch which can be actuated by an operator, for example from the cab 66 of the agricultural machine 10. Via the setting device 46, desired values or limit values can be entered, which are to be taken into account by the electronic control unit 40 in a specific control algorithm or control procedure. For example, a pressure desired value or pressure limit value may be predetermined, whereupon the electronic control unit initiates a corresponding control algorithm or a corresponding control procedure, in which the preset pressure value is not overshot or undershot. This is similarly possible, for example, also in predetermining a specific speed value for the lowering speed of the lifting mechanism. Then, according to the signals delivered by the position sensor 54 (as a function of time), the electronic control unit 40 determines the lowering speed of the piston 52 and initiates a corresponding control algorithm or a corresponding control procedure, in which the set desired value or limit value is not overshot or undershot. Further sensors required for initiating other monitoring functions may be envisaged.

As illustrated in FIG. 2, the hydraulic arrangement according to the invention may comprise one or more additional blocks 68 with further hydraulic components described above, so that a further hydraulic cylinder 24' is additionally provided, which has a corresponding chamber 50' or a piston 52' and a piston rod 54' and similarly, via an inflow line 30' provided with a corresponding non-return valve 28', has a first outflow line 32', in which a corresponding pressure relief valve 62' is similarly arranged, the further hydraulic cylinder 24' being connected correspondingly to a position sensor 36' and to a pressure sensor 38'. Furthermore, a second inflow flow 22' is provided, in order to ensure the uniform supply of both hydraulic cylinders 24, 24', the second inflow valve 22' being arranged parallel to the first inflow valve 22 or being supplied in parallel by the hydraulic pump 18 and likewise being connected via a second outflow line 34', on the outlet side, to the tank 20. By this additional hydraulic cylinder 24' being arranged, it is possible to implement a position regulation (oblique-position compensation) of the lifting mechanism 12, in that the two hydraulic cylinders 24, 24' are activated separately from one another. Separate activation takes place, in the case of a common hydraulic pump 18, via the control procedures generated or initiated by the electronic control unit 40, since the electronic control unit 40 is designed in such a way that the two hydraulic cylinders 24, 24' can be activated or can be raised and lowered independently of one another via the electroproportional pressure relief valves 26, 26' or via the inflow valves 22, 22' supplied in parallel by the hydraulic pump 18. Thus, the lifting mechanism 12 can be raised and lowered differently according to the positioning of the hydraulic cylinders 24, 24' and, for example, a working implement or attachment 14 lying obliquely or non-parallel with respect to the ground surface can be brought into alignment.

In the exemplary embodiment illustrated in FIG. 2, the hydraulic pump 18 is designed as a constant-flow pump or as a fixed-displacement pump system. It would also be conceivable, however, as illustrated in FIG. 3, to design the hydraulic pump 18' as a variable-displacement pump or as a variable-displacement pump system. In this case, a variable activation of the hydraulic pump 18' takes place as a function of the pressure acting in the chamber 50 or 50', if appropriate in conjunction with a control signal triggered by the electronic control unit 40 or by the adjustment means 42, so that hydraulic fluid is conveyed only when the hydraulic cylinder or hydraulic cylinders 24, 24' is or are to be raised. To control the hydraulic pump 18' designed as a variable-displacement pump system in FIG. 3, alternatively to the pressure sensors 38, 38', a load-sensing device 69 may also be provided, via which the pressure in the inflow line or inflow lines 30, 30' is detected and the adjustment of the hydraulic pump 18' takes place as a function of the pressure signals delivered by the load-sensing device 69. In the event that only one hydraulic cylinder 24 is activated, that is to say only one inflow valve 22 is provided, the load-sensing device 69 extends between the inflow line 30 and the hydraulic pump 18'. In the case of two activated hydraulic cylinders 24, 24', the load-sensing device extends correspondingly between both inflow lines 30, 30', the pressure signal higher in each case being detected via a pressure balance 69' arranged in the load-sensing device 69 and being used for controlling the hydraulic pump 18'. In the exemplary embodiment depicted in FIG. 3, the inflow valve 22 and 22' is also designed as a ³⁄₂-way valve, but with two inlets (per switching position) located on the hydraulic-pump side and with only one outlet (per switching position) located on the hydraulic-cylinder side, in such a way that, here, a second outflow line 34' extends on the inlet side of the inflow valve 22 or 22' to the hydraulic tank 20, the inflow valve 22 or 22' not being connected on the outlet side to the hydraulic tank 20, and, in a position closed on the inlet side of the inflow valve 22 or 22' to the hydraulic pump 18', being capable of venting the inflow line 30 or 30', so that the non-return valve 28 or 28' closes. When a load-sensing device 69 is used as pressure control for the hydraulic pump 18', the load-sensing device 69 is thus relieved towards the tank 20. In the exemplary embodiment illustrated in FIG. 3, the excess pressure device 48 from FIG. 2 may be dispensed with. As already mentioned, the circuit described here may be used for activating one or more hydraulic cylinders 24 or 24', in which case, where there is only one hydraulic cylinder 24, the corresponding components illustrated in block 68 and connected to the second or further hydraulic cylinder 24' may be dispensed with.

Some functions, then, which can be carried out by means of the hydraulic arrangement according to the invention, are described below. Raising and lowering, vibration damping, floating position, ground contact pressure regulation, position regulation and traction regulation.

As already mentioned, raising and lowering are preferably carried out by the actuation of the adjustment device 42. When the adjustment device 42 (for example, the actuating lever of a joystick) is brought into the raising position, an adjustment signal occurs which is sent to the electronic control unit 40. This, in turn, generates, according to an implemented control procedure, a control signal for the inflow valve 22 which is displaced into an opening position for the inflow line 30 or 30'. In the case of the variable-displacement pump system, at the same time the hydraulic pump 18' is activated (either electrohydraulically via the pressure sensors 38, 38' and the control unit 40 or hydraulically via the load-sensing device 69) and hydraulic fluid is conveyed correspondingly. Via the opening non-return valve 28 or 28', hydraulic fluid flows into the chamber 50 or 50' of the hydraulic cylinder 24 or 24', so that the piston 52 or 52' is moved or raised in the direction of the piston rod 54 or 54'. The adjustment device 42 has, in addition to the raising position, a neutral position and a lowering position. In the neutral position, the hydraulic fluid located in the chamber 50 or 50' is held via the automatically closing non-return valve 28 or 28' and via the closed pressure relief valve 26 or 26', the inflow valve 22 again being displaced into the closed initial position for the inflow line 30 or 30' via a corresponding control signal generated by the electronic control unit 40. If the hydraulic pump 18 is designed as a constant-flow pump, the hydraulic fluid which continues to be conveyed at a constant rate can flow out into the hydraulic tank 20 via the second outflow line 34. If the hydraulic pump 18' is designed as a variable-displacement pump system, the hydraulic fluid located in the inflow line 30 or 30' between the non-return valve 28 or 28' and the inflow valve 22 can flow out into the hydraulic tank via the second outflow line 34', so that the pressure built up there is broken down and the non-return valve 28 or 28' closes automatically. When the adjustment device 42 is brought into the lowering position, an adjustment signal occurs once again, which is sent to the electronic control unit 40. This, in turn, generates, according to the implemented control procedure, a control signal for the pressure relief valve 26 or 26' which is set to a lower opening pressure than prevails in the chamber 50 or 50', so that the pressure relief valve 26 or 26' opens and the hydraulic fluid located in the chamber 50 or 50' can escape into the hydraulic tank 20 and the piston 52 or 52' is lowered.

Vibration damping is made possible by the directed evaluation and utilization of the signals delivered by the sensors 36, 38 or 36', 38'. The fundamental principle is based on the fact that the load due to the pressure in the hydraulic cylinder 24 or 24' can be supported or the electroproportional pressure relief valve 26 or 26' and possible shocks can thus be absorbed. For this purpose, the control unit 40 implements a corresponding control procedure which causes the generation of control signals for vibration damping. The control procedure is activated, for example, via the actuating switch 44. The pressure relief valve 26 or 26' is activated in such a way that, when a presettable limit-pressure jolt is overshot, hydraulic fluid can escape from the chamber 50 or 50', so that a certain damping function is thereby afforded. The presettable limit pressure may in this case be preselected via the setting device 46 or else be preprogrammed in the control procedure. If the hydraulic cylinder 24 or 24' experiences a shock which causes a pressure rise in the system, resulting in an overshooting of the presettable limit pressure, the pressure relief valves 26, 26' open automatically and cause a retraction of the hydraulic cylinder 24, 24' or cause a compression (retraction) of the piston 52, 52'. At the same time, the position of the piston 52 or 52' is detected via the position sensor 36 or 36' and, according to the raising function, the piston 52 or 52' is brought into its original position (position before compression) again. Should the piston 52 or 52' move in the opposite direction due to a shock, the control unit 40, via the position sensors 36, 36', records a corresponding travel of the piston 52, 52' and by means of the control procedure causes an immediate refilling of hydraulic fluid according to the raising function. Via the detection of the position of the piston 52 or 52', a corresponding lowering function is then induced, and the piston 52 or 52' is brought into its initial position again. These processes may be repeated correspondingly, as desired, so that a springing function for vibration damping is avoided, especially since the hydraulic arrangement according to the invention has high dynamics which are important particularly in attachments (harvesting attachments). Furthermore, the hydraulic arrangement according to the invention has a high regulating performance, since, for example, by the signals delivered by the pressure sensor 38 or 38' being detected, it is recognized whether the load in the hydraulic cylinder 24 or 24' may possibly have decreased, so that a corresponding adaptation, which satisfies the changed pressure conditions, may take place for the activation of the pressure relief valve.

A function for a floating position can be implemented in a very simple way in that the electroproportional pressure relief valve 26 or 26' is opened slowly and thereby retracts the piston 52 or 52' of the hydraulic cylinder 24 or 24'. If the piston 52 or 52' is not retracted any further, the pressure relief valve 26 or 26' is opened further, so that hydraulic fluid can flow back and forth, pressureless, between the hydraulic tank 20 and the hydraulic cylinder 24 or 24', and the hydraulic cylinder 24 or 24', together with the attachment or mounted implement, or the entire lifting mechanism can move freely according to the contours of a ground surface. For this purpose, the pressure relief valves 26, 26' may be provided with a follow-up suction device 70 or 70', in order to assist an afterflow of hydraulic fluid out of the tank 20. The lowering speed of the piston 52 or 52' may in this case be monitored via the position sensor 36 or 36', so that the piston 52 or 52' of the hydraulic cylinder 24 or 24' is not retracted too quickly, possibly causing damage. The activation of the floating position function may likewise take place via the actuating switch 44, whereupon a corresponding control procedure is carried out which is implemented in the control unit 40 and which causes the generation of corresponding control signals for the floating position function.

A function for regulating the ground contact pressure is likewise activated by means of the actuating switch 44. A corresponding control procedure is implemented in the electronic control unit 40. The control procedure causes a constant volume flow of hydraulic fluid into the chamber 50 or 50' of the hydraulic cylinder 24 or 24', the said volume flow at the same time flowing out to the hydraulic tank 20 via the electroproportional pressure relief valve 26 or 26'. This allows highly effective regulation of the ground contact pressure, since the ground contact pressure itself is determined by setting the pressure relief valve 26 or 26', and there is no need for a high outlay in terms of electronic regulation. Via the setting device 46, a limit pressure critical for controlling the opening of the pressure relief valve 26 or 26' can be predetermined, so that the chamber 50 or 50' can be acted upon, according to the value predetermined by the setting device 46, via a limit pressure which gives rise to a corresponding ground contact pressure. The quantity of hydraulic fluid flowing into the chamber 50 or 50' is regulated in such a way that the ground contact pressure exerted on the ground surface via the dead weight of the lifting mechanism 12 (together with the attachment or mounted implement) is compensated to a desired extent predetermined by the setting device 46, so that, for example in the case of a complete compensation of the dead weight force of the lifting mechanism, the entire resultant ground contact pressure is equal to zero. A maximum resultant ground contact pressure is therefore achieved in that the entire dead weight of the lifting mechanism bears on the ground surface and the chamber 50 or 50' is correspondingly relieved of pressure. Of course, by the signals delivered by the pressure sensor 38 or 38' being utilized, the ground contact pressure can be regulated by means of the continuous raising and lowering of the piston 52 or 52' of the hydraulic cylinder 24 or 24'.

Position regulation is achieved by detecting and monitoring the signals delivered by the position sensors 36 or 36'. Activation of the position regulation may likewise be signalled by means of the actuating switch 44. A corresponding control procedure is implemented in the electronic control unit 40. The electronic control unit in this case compares the signals delivered by the position sensors 36 and 36' and causes a corresponding correction of the hydraulic cylinders 24 and 24'. Consequently, on the one hand, oblique positions of the lifting mechanism 12 can be compensated, but, on the other hand, oblique positions can also be brought about in a directed manner, in that, for example via further sensors 72 arranged on the agricultural machine 10 or on the lifting mechanism 12 or on the attachment 14 or on the working implement, corresponding signals are delivered, by means of which a change in position of the lifting mechanism 12 or of the attachment 14 or of the working implement is initiated. Sensors 72 of this type may be designed, for example, as contact sensors which are arranged on both sides of the lifting mechanism 12 or of the attachment 14 or of the working implement and which signal a variation in the distance from one of the sides to the ground, whereupon a re-regulation of the corresponding hydraulic cylinder 24, 24' to compensate a different signal delivered by the contact sensors takes place, in order to ensure that the lifting mechanism 12 or the attachment 14 or the mounted implement is guided parallel to the ground surface. The re-regulation or regulation of the hydraulic cylinders 24, 24' takes place similarly to the raising and lowering functions, as already described.

Traction regulation takes place by a corresponding evaluation of the signals delivered by the pressure sensors 38 or 38' by means of a control procedure implemented correspondingly in the electronic control unit 40. Traction regulation may in this case likewise be activated by the actuating switch 44 by virtue of a further switch position. By a corresponding limit pressure value being predetermined by the setting device 46, a regulation of the traction caused by the mounted implement suspended on the lifting mechanism 12 can take place. This function is intended primarily for agricultural machines, such as, for example, tractors, with lifting mechanisms designed as linkage devices, preferably as three-point linkage devices, other applications also being conceivable. Thus, for example, a working implement designed as a tillage implement may give rise to a traction which is determined by the depth of penetration of the working implement into the ground. A corresponding pressure load on the lifting mechanism can be detected by means of the pressure sensor 38 or 38' and can be regulated according to the predeterminable limit pressure value, here, too, the control or regulation of the hydraulic cylinders 24, 24' taking place similarly to the raising and lowering functions, as already described.

The various control procedures implemented in the electronic control unit 40 can be provided in a simple way by a person skilled in the art of control technology for hydraulic components and do not present any technical difficulty. A detailed description of the various control procedures is therefore dispensed with attention is drawn to the general knowledge of a person skilled in such an art.

Even though the invention has been described merely by means of two exemplary embodiments, the above description and the drawing afford a person skilled in the art with many different alternatives, modifications and variants which come under the present invention.

The invention claimed is:

1. Hydraulic arrangement for regulating a lifting mechanism (12) of an agricultural machine (10), with at least one first hydraulic cylinder (24) having a chamber (50) capable of being acted upon by pressure, with at least one proportionally adjustable inflow valve (22) which is connected on the outlet side via a first inflow line (30) to the chamber (50) and which is connected on the inlet side to a hydraulic pump (18, 18'), with at least one first outflow line (32) which makes a connection between the chamber (50) and a hydraulic tank (20), with adjustment means (42, 44) for generating an adjustment signal for the hydraulic cylinder (24), and with an electronic control unit (40), characterized in that a first electroproportional pressure relief valve (26) is arranged in the first outflow line (32) and a first non-return valve (28) closing in the direction of the inflow valve (22) is arranged in the first inflow line (30), and also one or more sensors (36, 38) related to the at least first hydraulic cylinder (24) and generating a sensor signal are provided, the at least first pressure relief valve (26) being controllable or regulatable as a function of the one or more sensor signals and/or of the adjustment signal.

2. Hydraulic arrangement according to claim 1, further comprising at least one second hydraulic cylinder (24') parallel to the first hydraulic cylinder (24), and one or more sensors (36', 38') related to the second hydraulic cylinder (24') and generating a second sensor signal, and further wherein the adjustment means (42,44) generates a second adjustment signal characterized in that, the at least one second hydraulic cylinder (24') has a second chamber (50') capable of being acted upon by pressure and which can be activated similarly to the first hydraulic cylinder (24) via a second proportionally adjustable inflow valve (22') and is provided with a second inflow line (30') provided with a second non-return valve (28') and a second outflow line (32') provided with a second electroproportional pressure relief valve (26'), the second pressure relief valve (26') being controllable or regulatable as a function of the second sensor signals and/or of the second adjustment signal.

3. Hydraulic arrangement according to one of claims 1-2, characterized in that the adjustment means (42, 44) are designed as an actuating lever, a joystick, or an actuating switch.

4. Hydraulic arrangement according to one of claim 1, characterized in that at least one sensor (36, 36') is designed as a position sensor which delivers a sensor signal proportional to a position of a hydraulic cylinder piston (52, 52').

5. Hydraulic arrangement according to one of claim 1, characterized in that at least one sensor (38, 38') is a pressure sensor or load bolt which delivers a sensor signal proportional to a pressure in the chamber (50, 50') of the at least one first hydraulic cylinder (24, 24').

6. Hydraulic arrangement according to one of claim 1, characterized in that a setting device (46) is provided, as a potentiometer which is connected to the control unit (40) and by means of which a manipulated variable for the control unit (40) can be predetermined.

7. Hydraulic arrangement according to one of claim 1, characterized in that the inflow valve (22, 22') has on the outlet side a connection to the hydraulic tank (20), and the hydraulic pump (18) is designed as a constant-flow pump.

8. Hydraulic arrangement according to one of claim 1, characterized in that the hydraulic pump (18') is designed as a variable-displacement pump system adjustable as a function of a pressure acting in the first and/or second or further inflow line (30, 30').

9. Hydraulic arrangement according to claim 1, characterized in that further sensors (72) are provided, as contact sensors which detect with respect to the ground surface a position of an attachment (14) or mounted implement fastened to the lifting mechanism (12) of the agricultural machine (10) and which are connected to the electronic control unit (40).

\* \* \* \* \*